US005551793A

United States Patent [19]

Lewis

[11] Patent Number: 5,551,793

[45] Date of Patent: Sep. 3, 1996

[54] LOCKING DEVICE FOR ATTACHING AND REMOVING MISSILE WINGS AND THE LIKE

[75] Inventor: Richard S. Lewis, Chino Hills, Calif.

[73] Assignee: Loral Aerospace Corp., New York, N.Y.

[21] Appl. No.: 281,456

[22] Filed: Jul. 26, 1994

[51] Int. Cl.[6] .............................. B25G 3/18; F16B 21/00; F42B 10/00; E05C 3/06

[52] U.S. Cl. .......................... 403/322; 403/321; 403/324; 403/325; 292/197; 292/210; 292/224; 244/3.25

[58] Field of Search .................................... 403/321, 322, 403/325, 324, 326; 292/210, 197, 224, 229, 239, 98, 129; 244/3.25, 3.27, 3.28, 3.29, 137.4; 74/567, 569

[56] References Cited

U.S. PATENT DOCUMENTS 2,209,551 7/1940 Anderson ............................ 292/224 X 4,507,010 3/1985 Fujiya .................................... 403/322

4,932,694 6/1990 Cater, Sr. ............................... 292/210

*Primary Examiner*—Kenneth J. Dorner

*Assistant Examiner*—Bruce A. Lev

*Attorney, Agent, or Firm*—Kenneth W. Float; Anthony W. Karambelas

[57] ABSTRACT

A locking device for quickly attaching a wing to and removing the wing from a body of a missile, for example. The locking device is disposed in an opening in the wing and is adapted to secure the wing to the body of the missile using its attachment rail. The locking device comprises a rotatable cam, a rotatable cam follower for locking the wing to the attachment rail, and a cam latch for locking the cam follower in place. The cam has a opening disposed therein that is suitable for accepting a locking tool, such as an Allen wrench, for example, that is used to rotate the cam, and hence the cam follower, to attach the wing to and remove the wing from a m-fissile. A plurality of springs are respectively employed to retract the the cam follower when the locking device is disengaged, and to secure the cam latch in place when the cam follower is locked in place.

13 Claims, 2 Drawing Sheets

LOCKING DEVICE FOR ATTACHING AND REMOVING MISSILE WINGS AND THE LIKE

BACKGROUND

The present invention relates to attachment and removal devices, and more particularly, to a device for quickly attaching and removing a wing of a missile, or the like.

Heretofore, missiles, such as the Chaparral missile manufactured by the assignee of the present invention, are shipped such that the missile body is separate from canards and wings. As a consequence, when the missile is to be loaded onto a vehicle and placed into an operational condition, the canards and wings must be connected to the body of the missile. The manner in which this has been done in the past is the following.

The missile body contains a plurality of integral 3/16 inch thick attachment rail or web that extends about one inch radially away from the tubular body of the missile. The attachment rail has a plurality of grooves cut in it roughly at a 45 degree angle relative to the axis of the missile. The wings have a curved base that matches the shape of the body of the missile and have a slot with bolts that extend across the slot and that are designed to slide into the grooves. Sliding the bolts into the appropriate grooves places the wing in contact with the body of the missile. Then, a two inch long locking bolt is inserted into a threaded hole in the aft end of the wing and a torque wrench is used to tighten the locking bolt against the aft end of the attachment rail. Unfortunately, the aft end of the attachment rail is a relatively small piece of metal and if the long locking bolt is overtightened by the torque wrench, the aft rail piece may be broken and the entire missile is made inoperable, since the integrity of the missile body is affected.

Therefore, it is an objective of the present invention to provide for a locking device that pen-nits quick attachment and removal of a wing of missile, or the like, and that eliminates the problems of the conventional approach outlined above.

SUMMARY OF THE INVENTION

In order to meet the above and other objectives, the present invention provides for a locking device for quickly attaching a wing to and removing the wing from a body of a missile, for example. The locking device is disposed within the wing structure and is adapted to secure the wing to the body of the missile using its attachment rail. The locking device comprises a rotatable cam, a rotatable cam follower for locking the wing to the attachment rail, and a cam latch for locking the cam follower in place. The cam has a opening disposed therein, such as one suitable for accepting a locking tool, such as an Allen wrench, for example, that is used to rotate the cam, and hence the cam follower, to lock and unlock the wing from the body of the missile. A plurality of springs may be used to retract the the cam follower when the locking device is disengaged, and to secure the cam latch in place when the cam follower is locked in place.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1A:
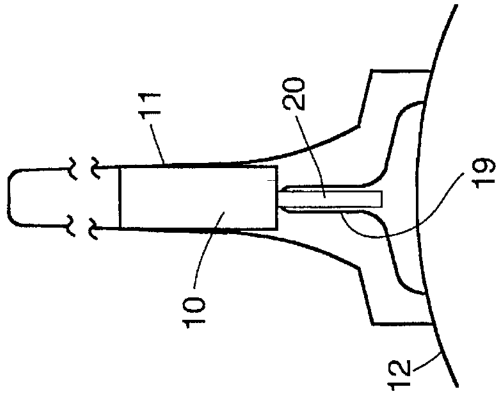
FIG. 1*a* shows a cross sectional end view of the locking device of FIG. 1.
Figure 1:
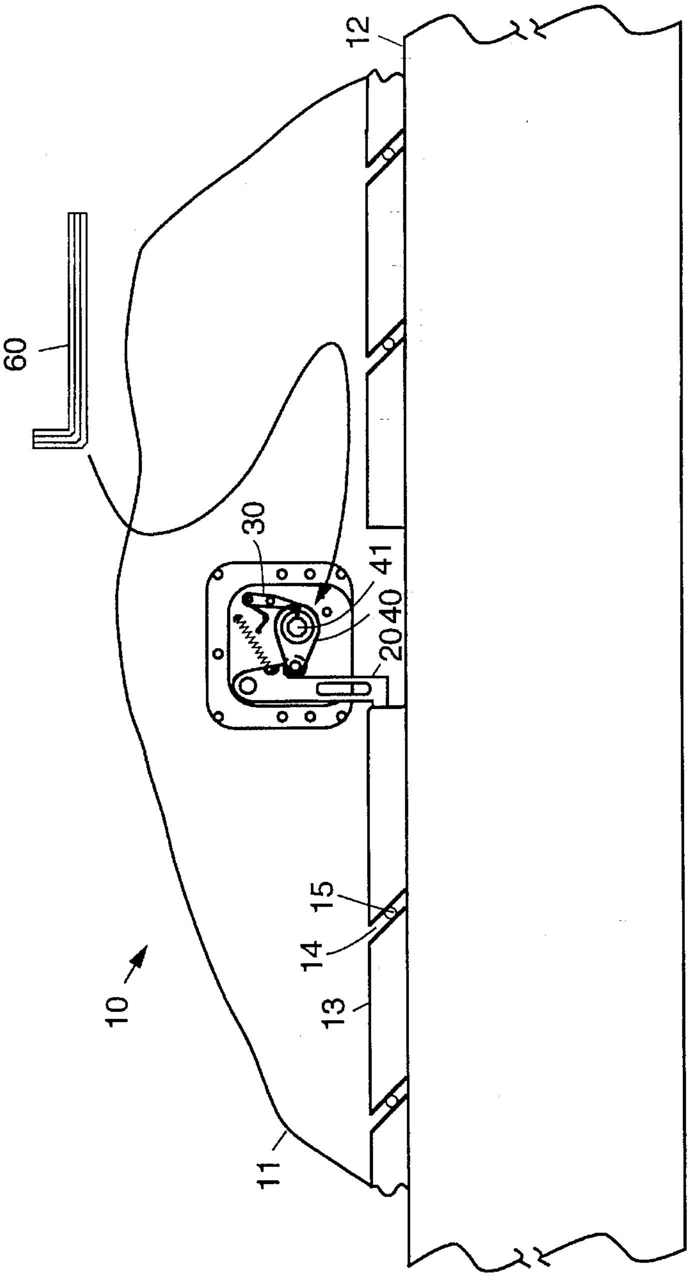
FIG. 1 illustrates a locking device in accordance with the principles of the present invention for attaching a wing to and removing the wing from a missile.

Referring to the drawing figures, FIG. 1 illustrates a locking device 10 in accordance with the principles of the present invention for attaching a wing 11 to and removing the wing 11 from a missile 12, for example. FIG. 1*a* shows a cross sectional end view of the locking device 10. The missile 12 is comprised of a circular or tubular body having a plurality of attachment rails 13 disposed around its periphery that are used to secure the wings 11 thereto. The attachment rails 13 are integral to the body of the missile 12 and are about 3/16 inches thick and extends about one inch radially away from the tubular body of the missile 12. Each of the attachment rails 13 have a plurality of grooves 14 disposed roughly at a 45 degree angle relative to the axis of the missile 12. Each of the wings 11 has a curved base that matches the shape of the body of the missile 12 and a slot 19 (FIG. 1*a*) having bolts 15 (FIG. 1), that extend thereacross that are designed to slide into the grooves 14. Sliding the wing 11 such that the bolts 15 slide into the grooves 14 places the wing 11 in contact with the body of the missile 12. The locking device 10 is then engaged to secure the wing 11 to the body of the missile 12.

The locking device 10 is disposed within the structure of the wing 11 in a cutout 16 or opening 16 disposed through the wing 11. The locking device 10 is designed to secure the wing 11 to the body of the missile 12 by means of the attachment rails 13. The locking device 10 comprises a rotatable cam 40, a rotatable cam follower 20 for locking the wing 11 to the attachment rails 13, and a cam latch 30 for locking the cam follower 20 in place. The rotatable cam 40 has an opening 41 disposed therein that is suitable for accepting a locking tool 60, such as an 3/8 Allen wrench 60, for example, that is used to rotate the rotatable cam 40, and hence the cam follower 20, to lock and unlock the wing 11 from the body of the missile 12.

Figure 2:
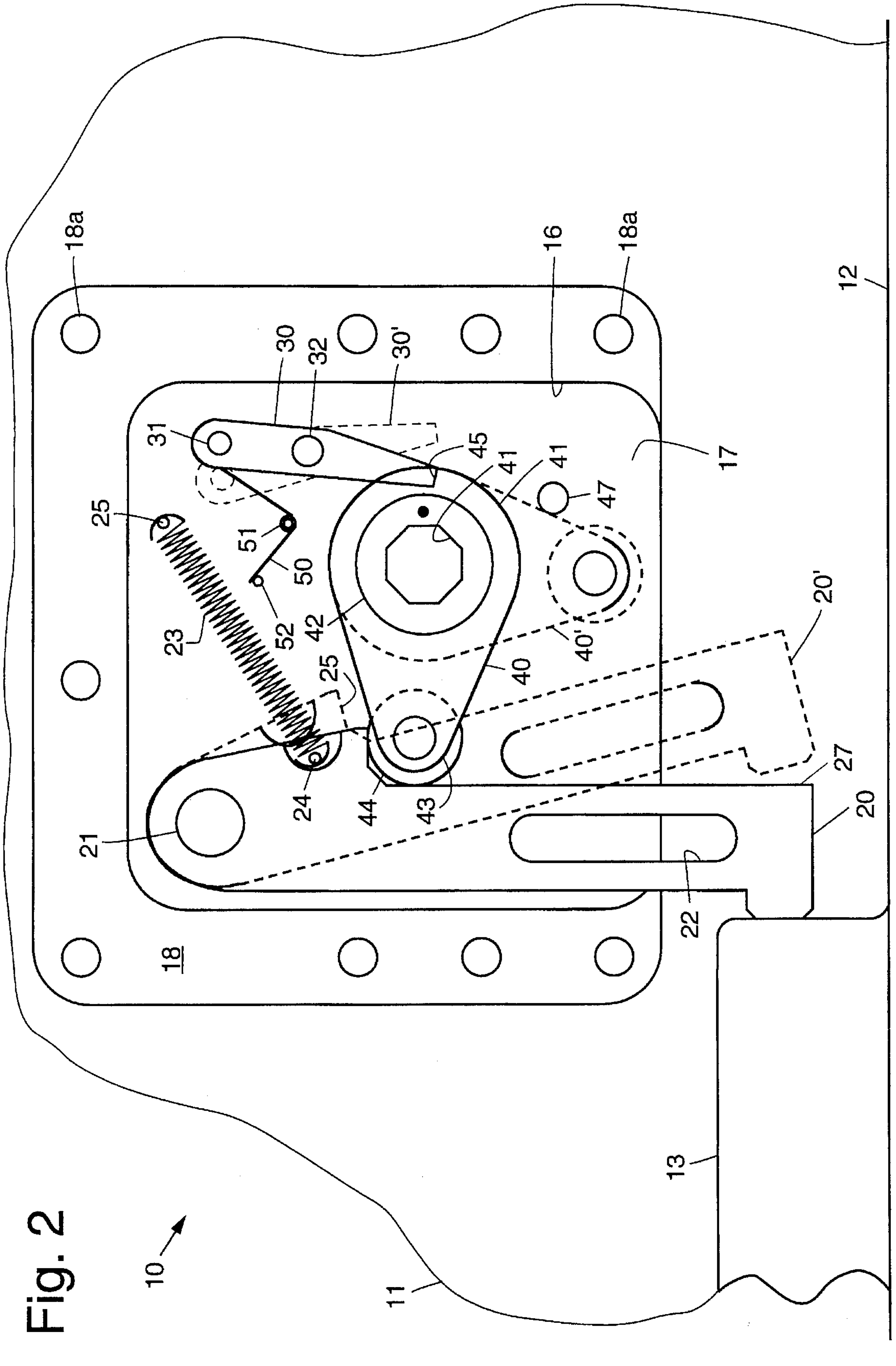
FIG. 2 shows an enlarged detailed view of the locking device of FIG. 1.

Referring to FIG. 2, it shows an enlarged detailed view of the locking device 10 of FIG. 1. The locking device 10 has a housing 18 generally having a square shape and is about 1/4 inches thick, and is substantially the same thickness as the wing 11. The locking device 10 is inserted into the opening 16 in the wing 11 from one side of the wing 11 and is secured by means of a cover (not shown) using a plurality of threaded holes 18*a* and screws (not shown). The cover has been removed in FIG. 2 to show the internal details of the locking device 10. The moving components of the locking device 10 are disposed in a recessed portion 17 of the wing 11.

The cam follower 20 comprises an L-shaped body having an opening 22 therein that is used to balance it and a lip 25 that is used to terminate motion of the cam 40. The cam follower 20 is rotatable around a pivot 21 and has a surface 27 that contacts the cam 40. A pin 24 is disposed in the body of the cam follower 20 that is used to secure a spring 23 that is employed to keep the cam follower 20 from vibrating when the wing 11 is not installed on the missile 12. The coil spring 23 is secured in the recess 17 by means of a second pin 25. FIG. 2 shows the cam follower 20 in two operable positions. The solid lines show the cam follower 20 in a position that locks the wing 11 to the missile 12. The dashed lines show the cam follower 20' in a position that allows removal of the wing 11 from the missile 12.

The rotatable cam 40 comprises a bearing 42 secured in the recess 17 in the housing 18 and the Allen opening 41 disposed therethrough. The rotatable cam 40 has a tapered shape and a second bearing 43 secures a rotatable wheel 44 or other contacting member 44, to the end of the rotatable cam 40. The wheel 44 or contacting member 44 is designed to roll or slide along the surface 27 of the cam follower 20 in order to rotate it to secure the wing 11 to the attachment rails 13 of the missile 12. The rotatable cam 40 has a notch 45 that is used to lock the cam 40, and hence the cam follower 20, in place when the wing 11 is locked to the attachment rails 13 of the missile 12. When the cam 40 is rotated to move the cam follower 20 into a position that locks the wing 11 to the attachment rails 13, the cam latch 30 seats in the notch 45 to secure the cam 40 and cam follower 20 in place.

The cam latch 30 has an elongated member with a flat end adjacent the location of the notch 45 that is pivotable around a pivot 32. The cam latch 30 may be tapered along its length. A release pin 31 is provided that engages a hole (not shown) beneath the cam latch 30 in the recess 17 in the body when the cam 40 is rotated into a position to secure the cam 40 and cam follower 40 in place. A wire spring 50 secured by means of a plurality of pins 51, 52 against one surface of the cam latch 30 that is used to secure the cam latch 30 in place when it has engaged the notch 54 of the cam 40.

In operation, the wing 11 is positioned such that the bolts 15 slide into the appropriate grooves 14 to place the wing 11 in contact with the body of the missile 12. At this time the locking device 10 is in an unlocked configuration, shown in dashed lines in FIG. 2. The locking device 10 is then engaged to secure the wing 11 to the body of the missile 12 as follows. An Alien wrench 60 or similar tool 60, is inserted into the opening 41 and is rotated so that the wheel 44 of the cam 40 engages the surface 27 of the cam follower 20'. The cam follower 20' is moved (to the left in FIG. 2) by the force of the wheel 44 on the cam follower 20'. The cam follower 20' is rotated into its locked position, indicated shown by the solid cam follower 20. The cam latch 30 engages the notch in the cam 40 and the pin 31 drops into its recessed hole, thus locking the locking device 10 in place and securing the wing 11 to the missile 12. To remove the wing 11, the Alien wrench is again inserted into the opening 41. The cam 40 is rotated clockwise while the pin 31 is depressed in the cam latch, thus permitting the cam latch 30 to be disengaged from the notch 45 by the action of the wire spring 50. The cam 30 is rotated counterclockwise so that the the cam follower 20 moves away from the attachment rails 13 due to the action of the coil spring 23. Once the cam follower 20 is freed from contact with the attachment rails 13, the wing 11 may be quickly removed therefrom.

Thus there has been described a new and improved locking device that permits quick attachment and removal of a wing of a missile, for example. It is to be understood that the above-described embodiment is merely illustrative of some of the many specific embodiments that represent applications of the principles of the present invention.

Clearly, numerous and other arrangements can be readily devised by those skilled in the art without departing from the scope of the invention.

What is claimed is:

1. A locking device comprising:

a rotatable cam having a opening disposed therein for receiving a locking tool, having a contacting member attached thereto and a notch for locking the cam;

a rotatable cam follower that is rotatable around a pivot, and having a surface for contacting the contacting member of the cam; and a pivotable cam latch for locking the cam follower in place that comprises a flat end for engaging the notch when the cam follower is locked in place, a release pin for engaging a hole disposed beneath the cam latch when the cam follower is locked in place.

2. The locking device of claim 1 further comprising a first spring member coupled to the cam follower for retracting the the cam follower when the locking device is disengaged.

3. The locking device of claim 2 wherein the first spring member comprises a coil spring.

4. The locking device of claim 1 further comprising a second spring member coupled to the cam latch for securing the cam latch in place when the cam follower is locked in place.

5. The locking device of claim 4 wherein the second spring member comprises a wire spring.

6. A locking device comprising:

a housing;

a rotatable cam disposed in housing having a opening disposed therein for receiving a locking tool, having a rotatable wheel attached thereto and a notch for locking the cam;

a rotatable cam follower disposed in housing that is rotatable around a pivot 21, and having a surface for contacting the rotatable wheel of the cam;

a pivotable cam latch disposed in housing or locking the cam follower in place that comprises a flat end for engaging the notch when the cam follower is locked in place, a release pin for engaging a hole disposed beneath the cam latch when the cam follower is locked in place;

a first spring member disposed in the housing and coupled to the cam follower for retracting the the cam follower when the locking device is disengaged; and a second spring member disposed in the housing and coupled to the cam latch for securing the cam latch in place when the cam follower is locked in place.

7. The locking device of claim 6 wherein the first spring member comprises a coil spring.

8. The locking device of claim 6 wherein the second spring member comprises a wire spring.

9. A locking device for attaching a wing to and removing the wing from a missile, said missile comprising a body having an attachment rail disposed on its periphery that is used to secure the wing thereto, and wherein the attachment rail has a plurality of grooves disposed therein, and wherein wing comprises bolts that slide into the grooves, said locking device comprising:

a housing disposed in an opening in the wing;

a rotatable cam disposed in housing having a opening disposed therein for receiving a locking tool, having a rotatable wheel attached thereto and a notch for locking the cam;

a rotatable cam follower disposed in housing that is rotatable around a pivot, and having a surface for contacting the rotatable wheel of the cam; and a pivotable cam latch disposed in housing for locking the cam follower in place that comprises a fiat end for engaging the notch when the cam follower is locked in place, a release pin for engaging a hole disposed beneath the cam latch when the cam follower is locked in place.

10. The locking device of claim 9 further comprising a first spring member disposed in the housing and coupled to the cam follower for retracting the the cam follower when the locking device is disengaged.

11. The locking device of claim 10 wherein the first spring member comprises a coil spring.

12. The locking device of claim 9 further comprising a second spring member disposed in the housing and coupled to the cam latch for securing the cam latch in place when the cam follower is locked in place.

13. The locking device of claim 12 wherein the second spring member comprises a wire spring.

* * * * *